(12) United States Patent
Smith

(10) Patent No.: US 8,234,524 B1
(45) Date of Patent: Jul. 31, 2012

(54) PROTOCOL ANALYSIS WITH EVENT PRESENT FLAGS

(76) Inventor: Dale Trenton Smith, San Jose, CA (US)

( * ) Notice: Subject to any disclaimer, the term of this patent is extended or adjusted under 35 U.S.C. 154(b) by 220 days.

(21) Appl. No.: 12/661,534

(22) Filed: Mar. 17, 2010

Related U.S. Application Data (60) Provisional application No. 61/277,634, filed on Sep. 28, 2009.

(51) Int. Cl.
*G06F 11/00* (2006.01)
(52) U.S. Cl. .......................... 714/35; 709/200
(58) Field of Classification Search ............. 714/35
See application file for complete search history.

(56) References Cited

U.S. PATENT DOCUMENTS

| | | | |
|---|---|---|---|
| 3,925,780 A * | 12/1975 | Van Voorhis ................ 341/63 |
| 4,430,702 A * | 2/1984 | Schiebe et al. .............. 710/305 |
| 4,598,364 A * | 7/1986 | Gum et al. ................ 714/38.13 |
| 5,457,694 A | 10/1995 | Smith |
| 6,134,676 A * | 10/2000 | VanHuben et al. ............ 714/39 |
| 6,230,313 B1 * | 5/2001 | Callahan et al. ............. 717/128 |
| 6,266,789 B1 | 7/2001 | Bucher et al. |
| 6,393,587 B2 | 5/2002 | Bucher et al. |
| 6,526,044 B1 * | 2/2003 | Cookmeyer et al. .......... 370/352 |
| 6,738,083 B2 * | 5/2004 | Allen ........................... 715/781 |
| 6,745,351 B1 * | 6/2004 | Mastro .......................... 714/57 |
| 6,915,466 B2 | 7/2005 | Mastro et al. |
| 6,931,574 B1 | 8/2005 | Coupal et al. |
| 6,961,925 B2 * | 11/2005 | Callahan et al. ............. 717/128 |
| 7,298,746 B1 | 11/2007 | De La Iglesia et al. |
| 7,669,177 B2 * | 2/2010 | Gerber et al. ................ 717/100 |
| 7,739,667 B2 * | 6/2010 | Callahan et al. ............. 717/128 |
| 2002/0129339 A1 * | 9/2002 | Callahan et al. ............. 717/127 |
| 2002/0177878 A1 * | 11/2002 | Poore et al. ..................... 607/9 |
| 2004/0024995 A1 * | 2/2004 | Swaine ......................... 712/227 |
| 2004/0268314 A1 * | 12/2004 | Kollman et al. .............. 717/128 |
| 2005/0091269 A1 * | 4/2005 | Gerber et al. ............ 707/103 X |
| 2005/0105769 A1 * | 5/2005 | Sloan et al. ................... 382/103 |
| 2005/0154838 A1 * | 7/2005 | DeWitt et al. ................. 711/144 |
| 2006/0101416 A1 * | 5/2006 | Callahan et al. ............. 717/128 |
| 2006/0268732 A1 * | 11/2006 | Smith .......................... 370/252 |
| 2006/0268859 A1 | 11/2006 | Smith |
| 2006/0268860 A1 | 11/2006 | Smith |
| 2006/0268914 A1 * | 11/2006 | Smith .......................... 370/412 |
| 2006/0271823 A1 | 11/2006 | Smith |
| 2006/0271853 A1 | 11/2006 | Marcos et al. |
| 2006/0288037 A1 * | 12/2006 | Sundararajan et al. ....... 707/102 |
| 2007/0255847 A1 | 11/2007 | Smith |
| 2009/0271434 A1 * | 10/2009 | George ..................... 707/103 R |
| 2011/0119469 A1 * | 5/2011 | Ohmacht ...................... 712/216 |
| 2011/0246836 A1 * | 10/2011 | Walker et al. ................... 714/45 |

\* cited by examiner

*Primary Examiner* — Kamini Patel
(74) *Attorney, Agent, or Firm* — Douglas L. Weller (57) ABSTRACT

The present invention discloses a method to record trace data in a way that significantly reduces the time required to search for specific events, to create an index, to create a histogram, or to analyze the protocol. During capture, the analyzer recognizes infrequent events and sets an Event-Present Flag ("EP Flag") indicating that a specific event has occurred. The trace is divided into pages, with a separate set of Event-Present Flags for each page indicating whether an event occurred in that page of the trace. This division of a trace into separate pages results in significant efficiencies.

25 Claims, 7 Drawing Sheets

Separate EP Flags – Page Creation Diagram

Separate EP Flags - Page Transfer Controller Sequence

FIGURE 2B

Separate EP Flags - Final Page Format

FIGURE 3A
Embedded EP Flags - Page Creation Diagram

FIGURE 3B

Embedded EP Flags - Final Page Format in Trace Buffer

Event Recognition – Single Compare

FIGURE 6

Event Recognition – Multi-Comparison State Machine

FIGURE 7

Dynamic Event Recognition – Assigning Values to EP Flags

US 8,234,524 B1

PROTOCOL ANALYSIS WITH EVENT PRESENT FLAGS

CROSS-REFERENCE TO RELATED APPLICATIONS

This application claims priority to U.S. Provisional Application No. 61/277,634 ("Smith"), filed Sep. 28, 2009, which is incorporated herein by reference.

STATEMENT REGARDING FEDERALLY SPONSORED RESEARCH/DEVELOPMENT

Not applicable.

REFERENCE TO SEQUENCE, TABLE, OR COMPUTER PROGRAM LISTING

Not applicable.

BACKGROUND OF THE INVENTION

A protocol analyzer (also known as a network analyzer, packet analyzer, protocol analyzer, or sniffer) is computer software or hardware that can intercept and log traffic passing over a digital communications network or part of a network. As data streams flow across the network, the protocol analyzer monitors and records select data from the data stream, and, if needed, decodes and analyzes its content according to an appropriate protocol or specification, particular to determine the presence of any events of interest, including but not limited to errors in data transmission.

Protocol analyzers often capture very large traces. Searching for errors or other events can be very slow, taking many minutes or even hours to accomplish. To solve this problem, some analyzers traditionally use hardware search engines, but these methods can only operate on the trace while it is in the analyzer's trace buffer, and are of no help when the trace is saved to a disk drive or other storage device. An example of this is found in U.S. Pat. No. 6,266,789 ("Bucher et al."). The problem is further compounded because storage devices generally have much slower access times and transfer rates than protocol analyzers. To solve the problem of slow searches and slow analysis, some analyzers process the entire trace after the capture has completed in order to gather information that is subsequently used to speed up the search and analysis while the user is viewing the trace. The gathered information is used to speed up searches, create histograms, generate statistics, and aid in analysis of the protocol. Unfortunately, post-capture information gathering can be very time consuming, causing the user to wait many minutes (or even hours, in the case of very large traces) before a user can fully view and navigate the trace. An example of post-capture indexing in order to speed up the creation of a histogram is found in U.S. Pat. No. 6,745,351 ("Mastro"). The present invention significantly reduces the time to search and analyze trace data, whether in the trace buffer or saved to storage elsewhere, without incurring the typical delays of post-capture gathering and processing as disclosed in the prior art.

BRIEF SUMMARY OF THE INVENTION

The present invention discloses a method and apparatus for recording trace data in a way that significantly reduces the time required to search for specific events, to create an index, to create a histogram, or to analyze the protocol. During capture, the analyzer recognizes infrequent events and sets an Event-Present Flag ("EP Flag") indicating that a specific event has occurred. The trace is divided into pages, with a separate set of Event-Present Flags for each page indicating whether an event occurred in that page of the trace. This division of a trace into separate pages results in significant efficiencies.

For instance, when searching the trace for an infrequent event, only the pages identified as containing the infrequent event need be searched, thus reducing both the overall percentage and number of pages of the trace that need to be searched. The overall improvement in search performance may be measured by a number of ways. For instance, overall improvement in search performance may be measured as a multiplier determined by dividing the number of pages in the trace by the number of pages containing the event. This method is more effective for events that occur rarely, and is most effective for events that do not occur in the trace. Thus the method provides the greatest speed improvement for events that take the longest time to search. The method has the unique advantage of providing fast searches without special search hardware or the need for post-capture processing of the entire trace, and with a minimal increase in trace size.

BRIEF DESCRIPTION OF THE DRAWINGS

To clarify the advantages and features of the present invention, a brief description of the drawings is provided. These drawings depict only typical embodiments of the invention and should not be considered limiting of its scope.

DETAILED DESCRIPTION OF THE INVENTION AND PREFERRED EMBODIMENTS

The process of capturing trace data into a trace memory is well known in the art. See for example, U.S. Pat. No. 5,457, 694 ("Smith") for a detailed description. The present invention may thus be applied to almost any prior art method for capturing trace data, e.g., by being inserted into the data path of the captured data before the trace memory controller writes the trace data into trace memory. The invention can be optimized for a specific bus to produce the fastest searching and analysis while minimizing the additional memory required to store the Event Present Flags ("EP Flags"). This optimization requires an understanding of the bus protocol and the relative frequency of the various events occurring on the bus. Since it is desirable to use the available memory efficiently, tradeoffs can be made, including but not limited to, which events should be grouped together into a single flag, which events should have their own flag, and which events should not be represented by a flag at all. One of skill in the art will recognize additional permutations and the examples provided here are not meant to be exhaustive.

Additionally, it is important to avoid creating too many EP Flags, or the time required to save a trace to a mass storage device will increase too much. For example, increasing the size of the trace by 20% will result in a 20% increase in the time required to save the trace. Also, since additional logic is required to recognize each event, the diminishing performance returns that result from adding more EP Flags will no longer be worth the cost at some point. In order to minimize the number of EP Flags required, extremely rare events can be grouped together into a single EP Flag rather than each having its own separate EP Flag. One example of events that can be grouped together is the various types of errors that occur on the bus, such as encoding/decoding errors, disparity errors, and framing errors. These errors normally occur very infrequently. Accordingly, it may be advantageous to group all of these different kinds of errors into a single EP Flag called "Any Error." Additional examples of rarely occurring events that can be grouped together are rare messages, such as messages used for error recovery or messages used for initial configuration. By grouping multiple rare events into a single EP Flag, it is possible to both save memory space and significantly improve search speed for certain events. Although adding EP Flags may actually increase the trace size by a few percent, it can reduce search and analysis performance time by orders of magnitude. This is particularly true in the case of EP Flags representing events that occur rarely.

The size of a trace page should be chosen to be within a reasonable range. It is desirable for a page to be at least as large as the largest packet or frame that will be captured during the trace. Much larger pages than this result in a higher percentage of pages that have an asserted EP Flag, thus resulting in longer average search times. Much smaller pages result in lower memory efficiency since a higher percentage of memory is being used to store the asserted EP Flags. In general, it has been found that a useful page size is equal to approximately twice the size of the largest packet or frame captured. Since most protocol analyzers give the user various filtering options which filter unwanted data during capture, the optimum page size may be different depending on the filtering options chosen. For example, users can choose to truncate longer packets, which may result in a smaller optimum page size.

There are two methods for storing the Event Present flags (EP flags) described. One method is to store the EP flags in memory that is separate from the main trace data. The other method is to embed the EP flags with the main trace data so that the trace data and EP Flags are stored in the same memory by the memory controller.

Below is a detailed description of the preferred embodiments of the invention. The descriptions serve to illustrate only typical embodiments of the invention and should not be read as limiting in any way the scope of the invention.

Figure 1:
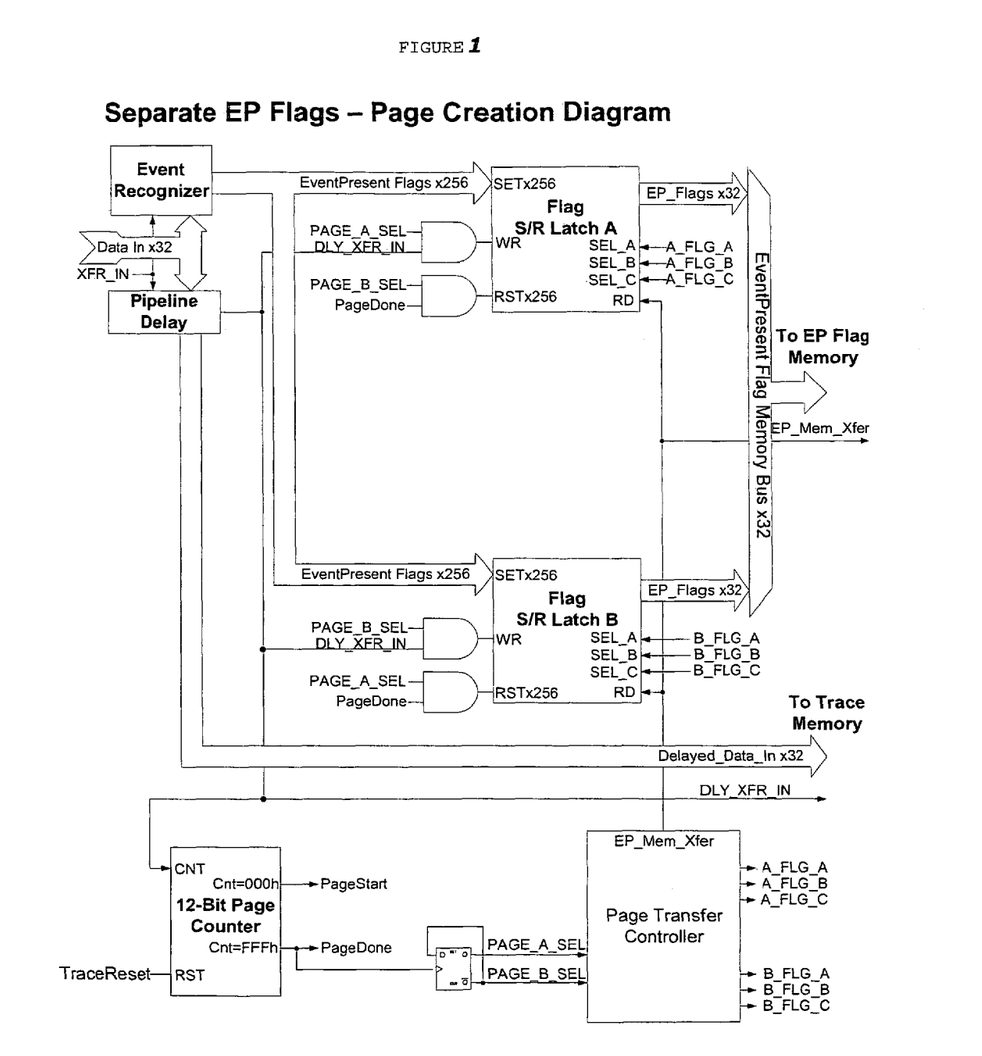
FIG. 1 (Separate EP Flags—Page Creation Diagram) illustrates an example of logic which may be used for dividing a trace into pages, and for creating and saving EP Flags corresponding to the pages in memory areas which are separate from the trace memory.

Referring to FIG. 1 entitled "Separate EP Flags—Page Creation Diagram," and "Separate EP Flags—Final Page Format," is an example of how to store EP Flags in separate memory.

1) A 12-bit Page Counter counts every 4096 Dwords of captured trace data and asserts the PageEnd signal indicating that a 4096 Dword page is full.
2) The Page Counter asserts the PageStart signal indicating the Start of each new page.
3) A flip/flop is toggled by the PageDone signal at the end of each page. The Q output of the flip/flop is the PAGE_A_SEL signal used to identify even pages (Page A), and the Q-NOT output is the PAGE_B_SEL signal used to identify odd pages (Page B).
4) An Event Recognizer identifies events occurring infrequently enough on the bus that they are not likely to occur in every page of the trace.
5) The Event Recognizer asserts an EP Flag for each infrequent event identified, which in the example given is 256 different events. The number of EP Flags can, of course, vary (e.g., can be more or less than 256) by changing the number of recognized events. One skilled in the art would recognize that the number of EP Flags is a matter of design choice based on performance requirements and tolerance for increase in trace size.
6) Each EP Flag is routed to a Page A latch and a Page B latch. The latch is used to store the first occurrence of each flag in a page until the flag can be transferred into EP Flag memory. The writing of EP Flags into the latch is only enabled when the page is selected by the PAGE_A_SEL or PAGE_B_SEL signals. Only one EP Flag Latch (A or B) is written at a time.
7) Each latch is reset just prior to its corresponding page being selected by PAGE_A_SEL or PAGE_B_SEL. The detection that a page is about to be selected is recognized by ANDing the PageDone signal with the Bank Select for the other page.
8) A Pipeline Delay is used to delay the Data_In and XFR_IN strobe, creating Delayed_Data_In and a DLY_XFR_IN strobe which is used to transfer the EP Flags into the latches.

Figure 2A:
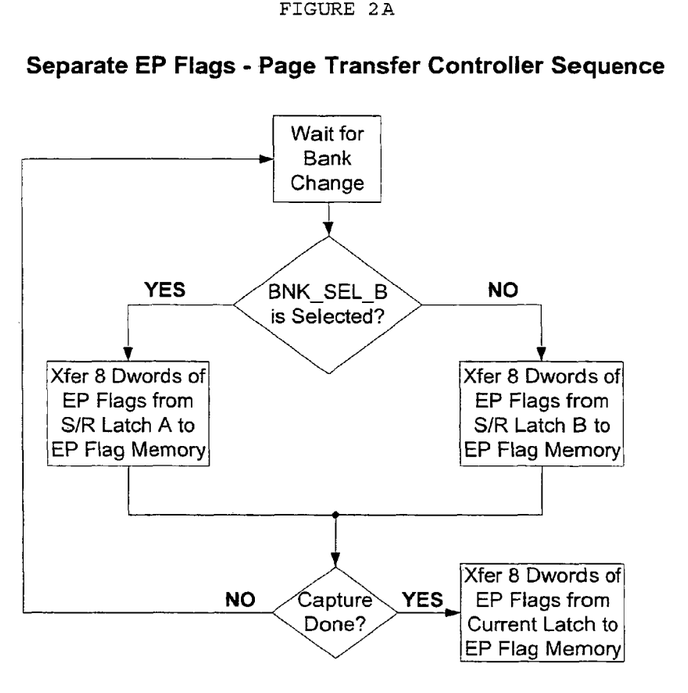
FIG. 2A (Separate EP Flags—Page Transfer Controller Sequence) illustrates an example of how a Page Transfer Controller could store EP Flags from alternating banks of EP Flag latches into separate memory from the trace data.
Figure 2B:
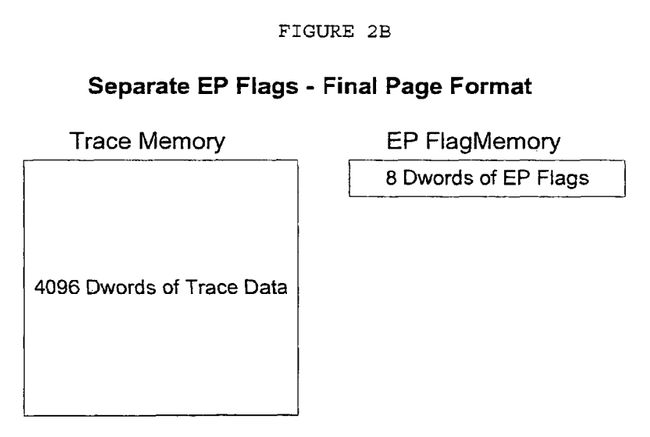
FIG. 2B (Separate EP Flags—Final Page Format) illustrates an example of the final format of a page with the EP Flags separate from the trace data.

Referring to FIG. 2A entitled "Separate EP Flags—Page Transfer Controller Sequence":

1) A Page Transfer Controller transfers the EP Flags to the Memory Controller for writing into trace memory. The transfer occurs for the PageA EP Flags when PageA latching is complete and when PageB is enabled for Flag latching by PAGE_B_SEL. Alternatively, the transfer occurs for the PageB EP Flags when PageB latching is complete and when PageA is enabled for Flag latching by PAGE_A_SEL.
2) When the CaptureDone signal is asserted, the Page Transfer Controller transfers the EP Flags for the currently selected Page to the Memory Controller for writing into trace memory, and thereafter the trace capture is complete.

Referring to FIG. 2B entitled "Separate EP Flags—Final Page Format": the format of a page of trace data is shown as separate from the memory area where the EP Flags are stored. This separate memory area for EP Flags is not contiguous with the memory area the corresponding page of trace data is stored in. The separate EP Flag area may even reside in different memory devices than the corresponding page of trace data.

Figure 3A:
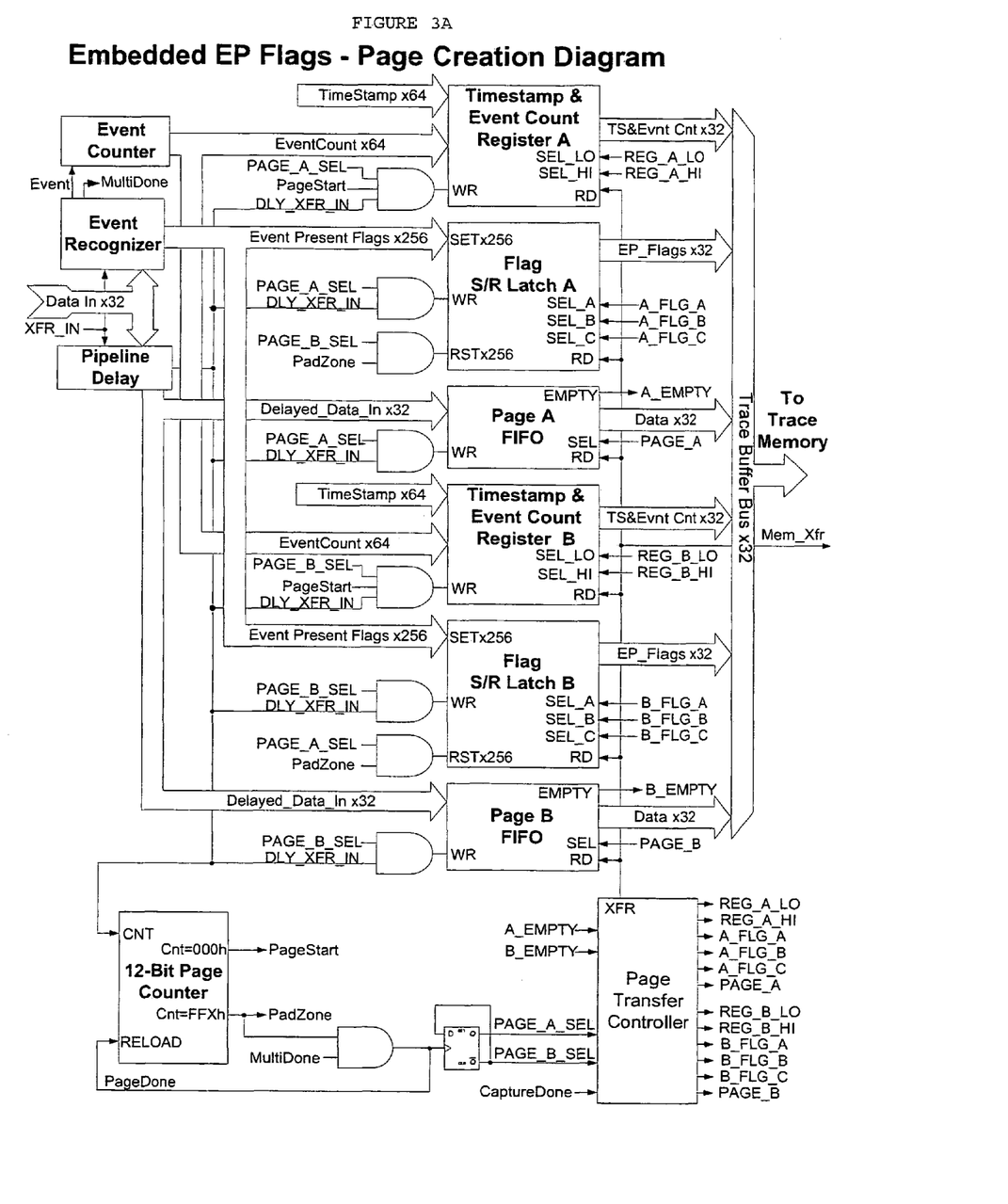
FIG. 3A (Embedded EP Flags—Page Creation Diagram) illustrates an example of logic which may be used for dividing a trace into pages, and for creating and saving EP Flags into the same memory area as the trace data.
Figure 3B:
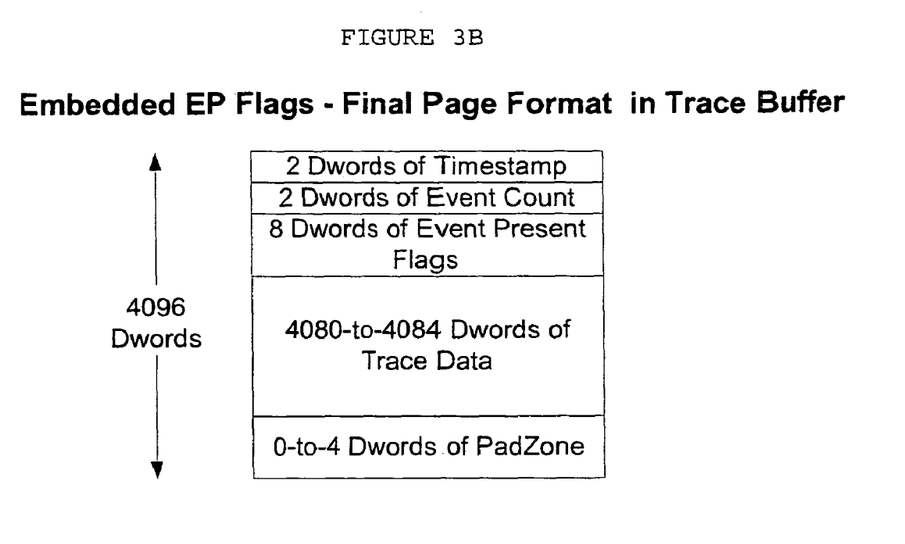
FIG. 3B (Embedded EP Flags—Final Page Format in Trace Buffer) illustrates an example of the final format of a page with the EP Flags saved in the same memory page as the trace data.

Referring to FIG. 3A entitled "Embedded EP Flags—Page Creation Diagram," and FIG. 3B "Embedded EP Flags—Final Page Format in Trace Buffer," an example of how to create EP Flags embedded with the trace data is provided. Additional desirable techniques are also added into this description, such as providing a Timestamp and Event Count for the first event in each page, and ensuring that multi-Dword events are not broken into separate pages if they are captured just before a page boundary. The following example is used to create 4096 Dword page boundaries and to create EP Flags, Timestamps, Event Counts, and trace data for each page of Trace Data, and then to transfer the EP Flags, Timestamps, Event Counts, and trace data into trace memory.

1) A 12-bit Page Counter counts every 4080 Dwords of captured trace data and asserts the PadZone signal indicating that the page is about to be full. The page holds 4096 Dwords, with 16 Dwords being reserved for Timestamp, Event Count, EP Flags, and PadZone.
2) To prevent breaking multi-Dword events into separate pages when a page boundary is reached, a technique is used whereby the PadZone signal is ANDed with the MultiDone signal provided by the Event Recognizer, to create the PageDone signal. The PadZone signal indicates that the page is about to be full. The MultiDone signal is asserted during the last DWord of any event that should not be broken apart into two pages. For example, if it is desired that a 4-Dword event is stored in a single page, the Event Recognizer will only assert MultiDone during the 4th Dword of that event. This prevents the Page Counter from reloading until the entire 4-Dword event has been stored. The PadZone ensures that there is enough space remaining in the page to store a multi-Dword event before reloading the Page Counter and beginning a new page. While in the example a desired 4-Dword event is used, the MultiDone signal can also be programmed to suit any number of Dword length event, including a single-Dword event.
3) The PageDone signal indicates that the page is completed and it reloads the Page Counter with the starting count of 000h.
4) The Page Counter asserts the PageStart signal when the count is 000h, indicating the Start of each new page.
5) A flip/flop is toggled by the PageDone signal at the end of each page. The Q output of the flip/flop is the PAGE_A_SEL signal used to identify even pages (Page A), and the Q-NOT output is the PAGE_B_SEL signal used to identify odd pages (Page B).
6) An Event Recognizer identifies events occurring infrequently enough on the bus that they are not likely to occur in every page of the trace.
7) The Event Recognizer asserts an EP Flag for each infrequent event identified.
8) Each EP Flag is routed to a Flag S/R (Set/Reset) Latch A latch and a Flag S/R Latch B latch which are used to store the flag until it can be transferred into EP Flag memory. The writing of EP Flags into the latch is only enabled when the page is selected by the PAGE_A_SEL or PAGE_B_SEL signals. Only one page (A or B) is written at a time.
9) Each latch is reset just prior to its corresponding page being selected by PAGE_A_SEL or PAGE_B_SEL. The detection that a page is about to be selected is recognized by ANDing the PageDone signal with the Bank Select for the other page.
10) A Pipeline Delay is used to delay the Trace Data and the XFR_IN strobe to create Delayed_Data_In and a DLY_XFR_IN strobe which compensate for the delays of the Event Recognizer and synchronize the Trace Data transfers with the EP Flag transfers.
11) A Timestamp and Event Count are associated with each page. Both values are latched by the DLY_XFR_IN strobe when the page is selected and the PageStart signal is asserted. These latched values hold the Timestamp and Event Count that correspond to the first event stored in the page.

Figure 4:
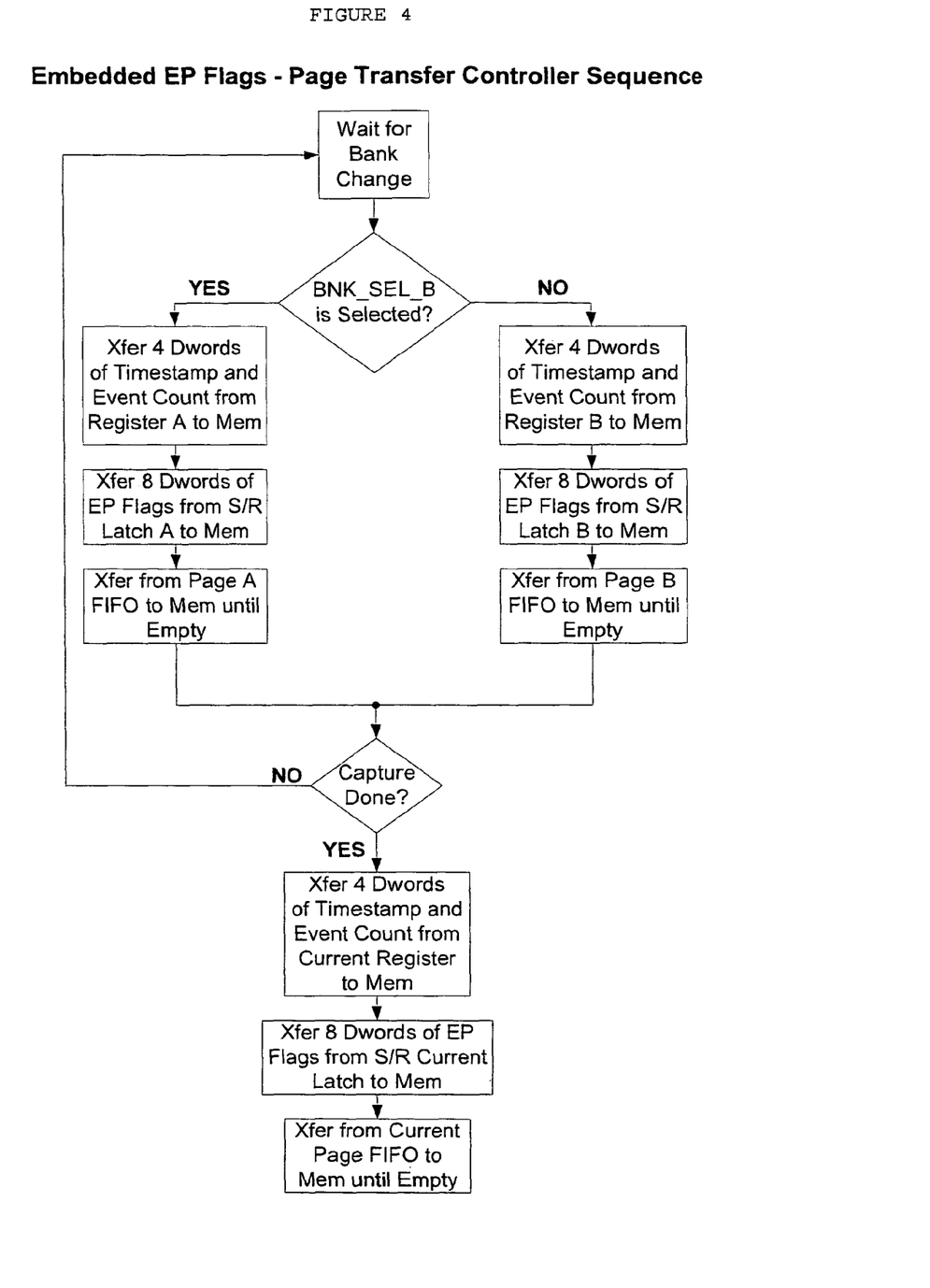
FIG. 4 (Embedded EP Flags—Page Transfer Controller Sequence) illustrates an example of how a Page Transfer Controller could store alternating banks of Timestamp, Event Count, EP Flags, and Trace Data into alternating pages of memory.

Referring to FIG. 4 entitled "Embedded EP Flags—Page Transfer Controller Sequence":

1) A Page Transfer Controller transfers the Timestamp, Event Count, EP Flags, and Trace Data to the Memory Controller which writes them into trace memory. The transfer occurs for the PageA Timestamp, Event Count, EP Flags, and Trace Data when PageA latching is complete and PageB is enabled for latching by PAGE_B_SEL. Alternatively, the transfer occurs for the PageB Timestamp, Event Count, EP Flags, and Trace Data when PageB latching is complete and PageA is enabled for latching by PAGE_A_SEL.
2) When the CaptureDone signal is asserted, the Page Transfer Controller transfers the Timestamp, Event Count, EP Flags, and Trace Data for the currently selected Page to the Memory Controller, and the trace capture is complete.

Figure 5:
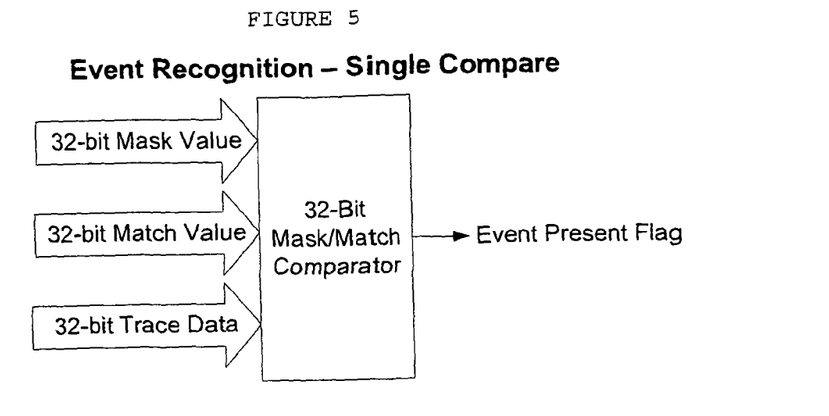
FIG. 5 (Event Recognition—Single Compare) illustrates a block diagram for creating an EP Flag from a Double-Word (Dword) of data by performing a mask/match compare on the Dword.

Referring to FIG. 5 entitled "Event Recognition—Single Compare," a single-Dword event may be recognized by comparing the incoming trace data with the definition of that event. The definition may include both exact match and mask values. The mask is needed when the event definition is programmable rather than hardwired, and when the bits that are compared differ from one event definition to another. If an event definition is not programmable, the mask is not needed and comparators or other combinational logic may be used to recognize the event and to assert an EP Flag when the event occurs.

Figure 6:
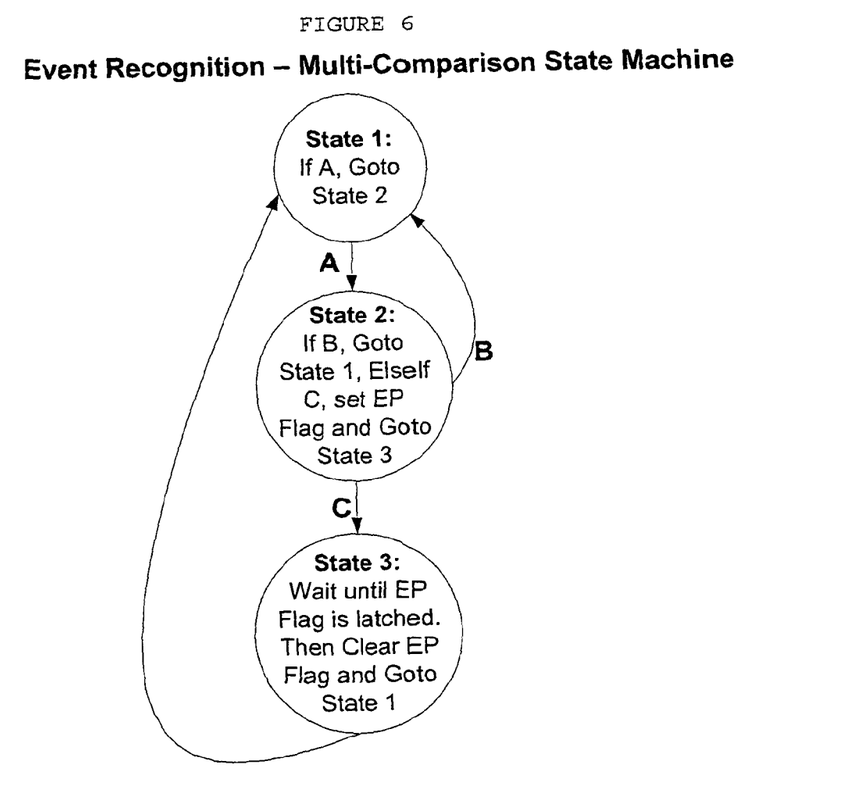
FIG. 6 (Event Recognition—Multi-Comparison State Machine) illustrates a system for creating an EP flag by performing a mask/match comparison on a sequence of Dwords.

Referring to FIG. 6 entitled "Event Recognition—Multi-Comparison State Machine," an example of a state machine that can recognize sequences of non-consecutive Dwords is given. Often, an event cannot be recognized from a single Dword, but requires that a sequence of Dwords be compared or otherwise evaluated. The sequence of Dwords may be consecutive or non-consecutive. In the example, State 1 waits for the first event in the sequence which is Event A. When Event A is recognized, it branches to State 2 which waits for a second event, Event B, which indicates that the sequence should start over with Event A, and a third event, Event C, which indicates that the second event in the sequence of non-consecutive events has been found. If Event C is found during State 2, then State 3 is entered, which sets the EP Flag indicating that the non-consecutive sequence has been found. After the EP Flag has been latched during State 3, the EP Flag is cleared and State 1 is entered and the sequence starts over again.

An additional element that may be incorporated is a timeout counter that calculates the time elapsed before or between recognition of events of interest, e.g., Events A, B, or C. A timeout counter can be set to "restart" upon too little time having elapsed before recognition of an event of interest or too much time having elapsed since the recognition of the last event of interest. Upon determination of either too little or too much time having elapsed, State 1 is entered and the sequence starts over again.

Another element is an event counter which may be employed to calculate the number of events that have elapsed before or between recognition of events of interest, e.g., Events A, B, or C. An event counter can be set to "restart" upon too few events counted before recognition of an event of interest or too many events counted since the recognition of the last event of interest. Upon determination of either too few or too many events counted, State 1 is entered and the sequence starts over again.

The definition of the Event Present Flags may be pre-defined, or they may be dynamically defined, such as where the first occurrence of an event of interest assigns the event to the next available Event Present Flag, and from that point forward that Event Present Flag in each page represents that event. By dynamically assigning the meaning of the Event-Present Flags, the flags are utilized more efficiently because flags are only used for those events that occurred in the trace. Events that would have been assigned a flag if they had occurred are known to have not occurred if no flag is assigned to them.

Figure 7:
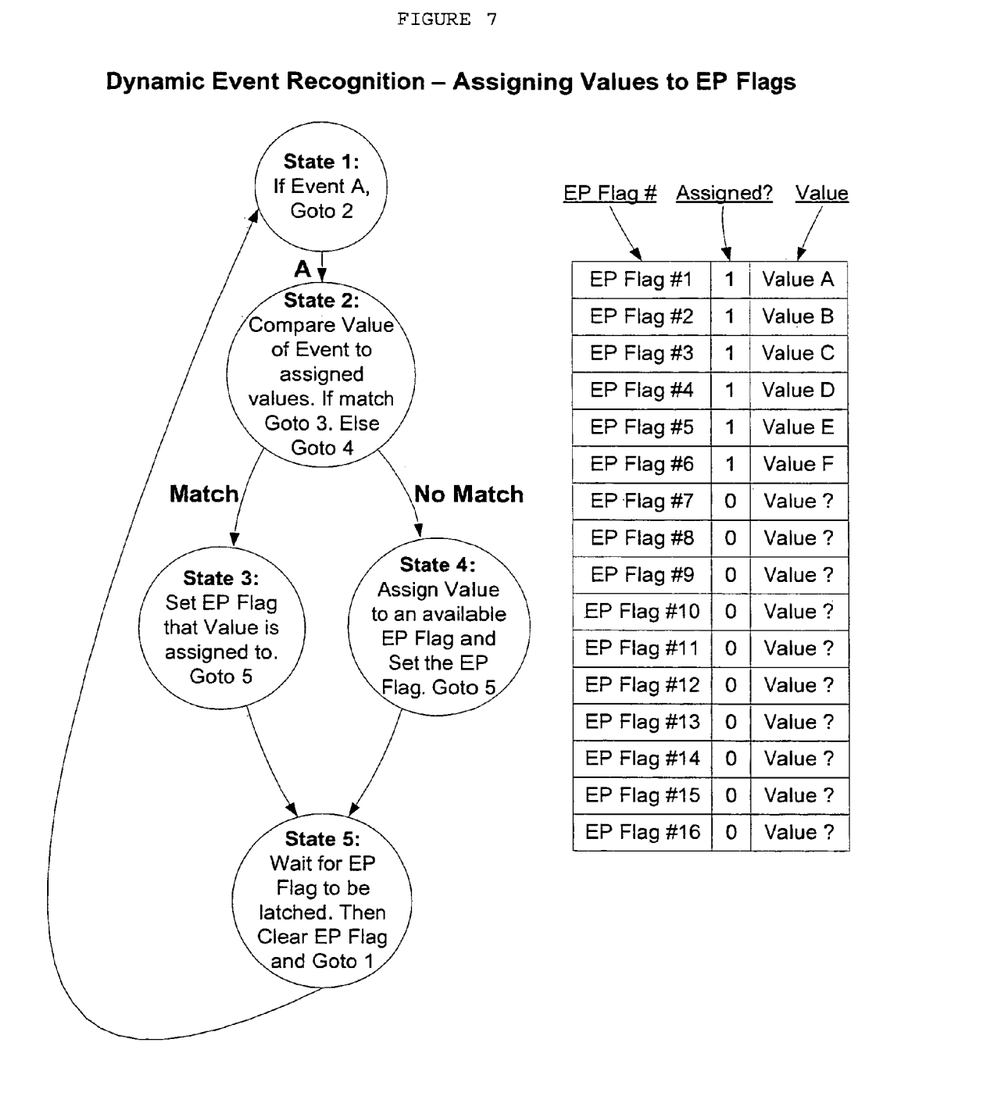
FIG. 7 (Dynamic Event Recognition—Assigning Values to EP Flags) illustrates a system for logic operating on a table to dynamically assign EP Flags to events so that EP Flag locations are only used for events that do occur in the trace.

Referring to FIG. 7 entitled "Dynamic Event Recognition—Assigning Values to EP Flags," an example of a state machine dynamically assigning EP Flags to events is shown. Typically, the event will consist of a combination of bits which define the event as a type of event, such as an address transfer, and additional bits that define the event more specifically, such as a specific address. Address fields can consist of many bits. For example, a 16-bit address contains 65,536 distinct values, which would require that many EP Flags if static EP flags were used to identify addresses. Often, only a small fraction of the total number of addresses is used. By dynamically assigning EP Flags to only those addresses that are used, the number of EP Flags can be kept to a minimum. As shown in the drawing, State 1 waits for Event A. State 2 compares the value of Event A with the value of any other Event A EP Flags already assigned a location in memory. If the value has already been assigned, State 3 is executed, followed by State 5, and the EP Flag is latched into trace memory. If the value has not been previously assigned, then the Value of Event A is written by State 4 into the value field of the next available memory location, and the corresponding "assigned" flag is set for that memory location. Then State 5 latches the newly assigned EP Flag into trace memory.

What is claimed is:

1. A method of recording and dividing trace data into two or more pages employing a mechanism to prevent the splitting of Dwords of a multi-Dword event across two separate pages, comprising:
   a. Determining a desired threshold of N-Dwords, wherein N is the desired minimum length of any event that should not be split across two separate pages;
   b. Employing a signal A to indicate that the end of a page is about to be reached;
   c. Employing a signal B to indicate that the Nth Dword of an event has been reached;
   d. Triggering the recording of trace data onto a new page upon the satisfaction of both signals A and B.

2. A protocol analyzer comprising:
   a first buffer having a capacity to receive one page of trace data as the trace data is captured by the protocol analyzer;
   a second buffer having a capacity to receive one page of captured trace data as the trace data is captured by the protocol analyzer;
   an event recognizer that, as the trace data is being captured by the protocol analyzer alternately in the first buffer and in the second buffer, recognizes an event of interest that occurs within the trace data, the event of interest having been selected so as to occur less frequently than once per page of data, the event recognizer setting a first flag when the event of interest is captured in trace data received by the first buffer and setting a second flag when the event of interest is captured in the second buffer; and,
   a transfer controller that alternately transfers trace data from the first buffer to a trace memory and from the second buffer to the trace memory;
   wherein when the transfer controller transfers trace data from the first buffer to the trace memory, a value of the first flag indicates whether trace data being transferred from the first buffer to the trace memory contains the event of interest; and,
   wherein when the transfer controller transfers trace data from the second buffer to the trace memory, a value of the second flag indicates whether trace data being transferred from the second buffer to the trace memory contains the event of interest.

3. A protocol analyzer as in claim 2:
   wherein when the transfer controller transfers trace data from the first buffer to the trace memory, the value of the first flag is embedded in the trace data being transferred to the trace memory; and,
   wherein when the transfer controller transfers trace data from the second buffer to the trace memory, the value of the second flag is embedded in the trace data being transferred to the trace memory.

4. A protocol analyzer as in claim 2:
   wherein when the transfer controller transfers trace data from the first buffer to the trace memory, the value of the first flag is transferred separate from the trace data being transferred to the trace memory; and,
   wherein when the transfer controller transfers trace data from the second buffer to the trace memory, the value of the second flag is transferred separate from the trace data being transferred to the trace memory.

5. A protocol analyzer as in claim 2 additionally comprising:
   a page counter that counts trace data as it is transferred to the trace memory.

6. A protocol analyzer as in claim 2 wherein the event recognizer recognizes other events in addition to the event of interest, the event recognizer setting corresponding flags when the other events are captured.

7. A protocol analyzer as in claim 2:
   wherein the event recognizer recognizes at least one other event in addition to the event of interest, the event recognizer setting the first flag when the at least one other event is captured in trace data received by the first buffer and setting a second flag when the at least one other event is captured in the second buffer.

8. A method comprising:
   capturing trace data alternately into a first buffer and into a second buffer;
   recognizing, as the data is being captured, when an event of interest occurs within the trace data, the event of interest having been selected so as to occur less frequently than once per page of data;
   setting a first flag when the event of interest is detected in trace data captured into the first buffer;
   setting a second flag when the event of interest is detected in trace data captured into the second buffer;

transferring trace data from the second buffer to a trace memory when the first buffer is receiving trace data, including transferring a value of the first flag; and, transferring trace data from the first buffer to the trace memory when the second buffer is receiving trace data, including transferring a value of the second flag.

9. A method as in claim 8:

embedding the value of the first flag in the trace data being transferred to the trace memory when transferring trace data from the first buffer to the trace memory; and, embedding the value of the second flag in the trace data being transferred to the trace memory when transferring trace data from the second buffer to the trace memory.

10. A method as in claim 8:

transferring the value of the first flag separately from the trace data when transferring trace data from the first buffer to the trace memory; and, transferring the value of the second flag separately from the trace data when transferring trace data from the second buffer to the trace memory.

11. A method as in claim 8 additionally comprising:

counting trace data as it is transferred to the trace memory.

12. A method as in claim 8 additionally comprising:

recognizing other events in addition to the event of interest; and, setting corresponding flags when the other events are captured.

13. A method as in claim 8 additionally comprising:

recognizing at least one other event in addition to the event of interest;

setting the first flag when the at least one other event is captured in trace data received by the first buffer; and, setting the second flag when the at least one other event is captured in the second buffer.

14. A protocol analyzer comprising:

a plurality of buffers, each buffer in the plurality of buffers having a capacity to receive one page of trace data as the trace data is captured by the protocol analyzer;

an event recognizer that, as the trace data is being captured by the protocol analyzer alternately in the first buffer and in the second buffer, recognizes an event of interest that occurs within the trace data, the event of interest having been selected so as to occur less frequently than once per page of data, the event recognizer setting a flag indicating which buffer from the plurality of buffers receives trace data that includes the event of interest; and, a transfer controller that alternately transfers trace data from each of the plurality of buffers to a trace memory;

wherein when the transfer controller transfers trace data to the trace memory only from those buffers from the plurality of buffers that is not currently receiving trace data a value of a flag is also transferred that indicates whether a page of the trace data currently being transferred contains the event of interest.

15. A protocol analyzer as in claim 14:

wherein when the transfer controller transfers trace data the value of the flag is embedded in the trace data being transferred to the trace memory.

16. A protocol analyzer as in claim 14:

wherein when the transfer controller transfers trace data to the trace memory, the value of the flag is transferred separate from the trace data.

17. A protocol analyzer as in claim 14 additionally comprising:

a page counter that counts trace data as it is transferred to the trace memory.

18. A protocol analyzer as in claim 14 wherein the event recognizer recognizes other events in addition to the event of interest, the event recognizer setting corresponding flags when the other events are captured.

19. A protocol analyzer as in claim 14:

wherein the event recognizer recognizes at least one other event in addition to the event of interest.

20. A method comprising:

capturing trace data alternately into each of a plurality of buffers;

recognizing, as the trace data is captured, when an event of interest occurs within the trace data, the event of interest having been selected so as to occur less frequently than once per page of data;

setting, for each buffer in the plurality of buffers, a flag which indicates into which buffer of the plurality of buffers the event of interest is captured in trace data; and, transferring trace data from each of the plurality of buffers to a trace memory, including a value of a flag that indicates whether the event of interest occurs in the trace data being transferred, wherein the trace data is transferred only from buffers in the plurality of buffers that are not currently receiving trace data.

21. A method as in claim 20:

embedding the value of the flag in the trace data being transferred to the trace memory.

22. A method as in claim 20:

transferring the value of the flag separately from the trace data when transferring trace data to the trace memory.

23. A method as in claim 20 additionally comprising:

counting trace data as it is transferred to the trace memory.

24. A method as in claim 20 additionally comprising:

recognizing other events in addition to the event of interest; and, setting corresponding flags when the other events are captured.

25. A method as in claim 20 additionally comprising:

recognizing at least one other event in addition to the event of interest.

* * * * *